Dec. 14, 1943.    L. C. PESKIN    2,336,956
VIBRATION TESTING APPARATUS
Filed Aug. 2, 1940
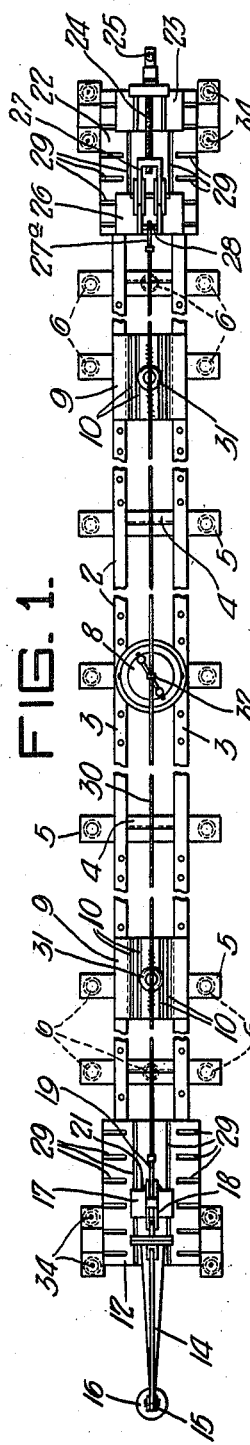
Inventor:
LEONARD C. PESKIN,
by: John E. Jackson
His Attorney.

UNITED STATES PATENT OFFICE 2,336,956

VIBRATION TESTING APPARATUS

Leonard C. Peskin, Shaker Heights, Ohio, assignor to The American Steel and Wire Company of New Jersey, a corporation of New Jersey Application August 2, 1940, Serial No. 349,721

7 Claims. (Cl. 73—51)

This invention relates to vibration testing equipment and particularly to an improved vibration testing apparatus or machine for testing the vibration of wire and the like.

While for many years the static physical properties, such as breaking strength, elongation, yield point, etc., of materials have received considerable study, it has been within recent years only that any appreciable attention has been applied to investigating the so-called dynamic properties of materials which have to do with the materials' resistance to fatigue failure, its damping capacity, impact strength, notch sensitivity, etc. By far, the majority of service failures of fabricated metal structures are the result of fluctuating stresses due to reciprocating or rotating parts, vibration, or shock, all of these being forces which call upon the dynamic properties of a material for resistance.

Although these dynamic properties of metals have been studied in their simplest forms, recent research has shown that such service failures as previously mentioned have more to do with the final fabricated form and shape of the metal structure than the elementary nature of the components themselves. In other words, while the fatigue properties of single metal wires are being studied on common rotating beam fatigue machines, a rope made from such wires may exhibit resistance to fatigue failure unpredictable from the known values found on its simple wire components. For example, simply changing a straight wire into a helical spring may alter the fatigue characteristics of the original wire. Reasons for this behavior of metals have to do with the fact that the dynamic properties of a material are tremendously influenced by the nature of the applied stresses, the residual surface stresses, the mechanical perfection of the metal surface, freedom from decarburization, etc., all of which are features having to do with the manner of fabricating the finished article. Consequently, in any proper approach to the problem of service failures due to dynamic causes, it is not alone sufficient to study the elementary metal going into the article to be used, but the final fabricated item itself must be investigated, and it is to a machine or apparatus for testing in vibration fatigue all types of wire fabricated items such as rail bonds, stranded wires, cables, composite electrical conductors, conductor ties, etc., to which the present invention relates.

Accordingly, it is the general object of the present invention to provide an improved machine or apparatus for testing the vibration fatigue of stranded wires, cables and other wire fabricated articles.

Various other objects and advantages of this invention will be more apparent in the course of the following specification and will be particularly pointed out in the appended claims.

In the accompanying drawing there is shown, for the purpose of illustration, one embodiment which my invention may assume in practice.

In this drawing:

Figure 1 is a plan view of the improved vibration testing apparatus of my invention;

Figure 2 is a side elevation thereof;

Figure 3 is an enlarged side elevation showing the tensioning or stress supplying means arranged at one end of the apparatus; and Figure 4 is an enlarged side elevation showing the tensioning or stress applying means arranged at the other end of the apparatus.

Referring more particularly to the drawing, the improved apparatus or machine of my invention includes a longitudinally extending frame or base member 2, constructed preferably of a plurality of relatively heavy metallic structural members. The frame or base 2 consists preferably of a pair of spaced apart longitudinally extending channel or I-beam members 3 which are preferably held in spaced relation by a plurality of transversely extending spaced apart channel members 4 arranged therebetween and to which they are securely attached by means of welding, rivets, bolts or in any other suitable manner. The longitudinally extending channel members 3 are supported preferably by a plurality of transversely extending spaced apart I-beam members 5. There is arranged below the I-beam members 5, resilient or shock absorbing means which consists preferably of a plurality of coil springs 6 which are adapted to absorb the vibration to which the frame 2 is subjected so as to isolate the vibration from surrounding equipment.

It will be understood that the I-beam members 5 are spaced a predetermined distance apart so that the weight of the frame and the load carried thereby is distributed evenly to all of the springs. That is to say, the coil springs 6 are arranged under the complete frame assembly so that each spring carries substantially the same load. Thus it will be seen that there is provided, in the present instance, a pair of springs under the centrally disposed I-beam members 5, three springs under the next outwardly disposed I-beam members, and four springs under the endmost I-beam members. The coil springs 6 rest preferably on wooden blocks 7 positioned directly on the floor or ground. There are arranged with the endmost I-beam members 5, as shown in Figure 2, cap screws 34 which are threaded therein and with each having a circular plate-like member 35 arranged therewith which is adapted to bear directly against the top of the respective coil springs 6. It is the purpose of the cap screws 34 to adjust the frame member 2 so that it is level at all times and so that each coil spring carries the proportion of the weight of the frame that it is designed to carry. Thus it will be seen that by means of these cap screws 34 the load on the table can be evenly distributed throughout all of the springs, thereby keeping the frame or table in balance.

There is arranged preferably on top of the frame 2 substantially centrally thereof, a vibrating device 8 which in the present instance is shown bolted to the channel members 3, but it will be understood that this vibrating device may be mounted on a suitable carriage so that the same can be moved to any desired position along the frame, or there may be arranged a series of complementary holes in the channel members 3 and the vibrating device may be adjustably attached thereto in any one of a number of positions of the frame. The vibrating device as shown in the present instance, is preferably a standard electrical vibration motor of the moving coil type. It consists generally of an alternating current drive coil moving in the field of a direct current magnet.

There is also mounted on top of the frame 2, a pair of table-like supporting members 9 with one disposed to each side of the center of the frame and the vibrating device 8 arranged thereon. The table-like members 9 are preferably bolted to the channel members 3 and there are also preferably arranged along the channel members complementary holes so that the table-like members can be adjustably arranged in any desired position therealong. The top of each of the table-like members 9 preferably has a plurality of longitudinally extending T-shaped slots 10 arranged therein for attaching purposes.

There is also arranged on top of the frame 2 beyond the table-like supporting member 9 at one end thereof, as is more clearly shown in Figure 3 of the drawing, another table-like member 12 and there is mounted thereon a bracket 13 which acts as a point of fulcrum or a pivot for a cantilever loading member 14 having means 15 arranged on the extreme outer end thereof on which various weights 16 are adapted to be disposed for applying the correct tension, stress or combination of stresses to the wire or article to be tested which will be more fully explained hereinafter. There is arranged forwardly of the bracket 13, a guide bracket 1 on which there is slidably mounted a U-shaped or yoke member 18 having the outer end thereof connected to the loading member 14 by means of a hook member 20 with a pin 21 arranged through the inner end thereof which is adapted to pass through a loop-shaped attaching member 19 which is attached to one end of the wire to be tested.

On the opposite end of the frame 2, as is more clearly shown in Figure 4, there is mounted a similar table-like member 22 on which there is mounted adjacent the outer edge thereof a bracket 23 which carries a screw 24 having a handle 25 arranged in the outer end thereof. There is also positioned on the table-like member 22 forwardly of the bracket 23, a second bracket 26 which slidably carries a U-shaped or yoke member 27 with the outer end thereof attached to the inner end of the screw 24 and having a pin 28 arranged through the inner end thereof which passes through a loop-shaped attaching member 27a to which the opposite end of the wire to be tested is attached. There is arranged in the top of both of the table-like members 12 and 22, longitudinally and transversely extending T-shaped slots 29 for receiving bolts for adjustably attaching the brackets 13, 17, 23 and 26, respectively, thereto.

In the present instance merely for the purpose of illustration, there is shown arranged in the testing machine an electrical conductor 30 with the center portion thereof top-tied to two conventional pin type insulators 31 with one mounted in the T-shaped slots 10 on each of the table-like supporting members 9. The one end of the conductor 30 is attached to the loop-shaped member 19 arranged with the pin 21 carried by the U-shaped member 18 with the necessary weights 16 arranged on the end of the loading member 14, as shown at the extreme left of Figure 1, so that the conductor is placed under tension in the present instance. The other end of the conductor 30 is attached to the loop-shaped member 27a arranged with the pin 28 carried by the U-shaped member 27 so as to be dead-ended and the screw 24 is turned by the handle 25 so that the tension in the conductor is brought to the desired testing value. The vibrating device 8 is coupled to the conductor 30 as at 32 substantially centrally of the distance between the insulators 31 preferably by means of a coil spring 33 or any other suitable resilient means, and by means of which the wire conductor may be made to undergo vibratory stresses through the action of the vibrating device.

While I have shown and described one embodiment of my invention, it will be understood that this embodiment is merely for the purpose of illustration and description, and that various other forms may be devised within the scope of my invention, as defined in the appended claims.

I claim:

1. Article vibration testing apparatus of the class described, including in combination, a longitudinally extending frame made of structural members, a plurality of resilient members arranged below the frame at predetermined spaced intervals throughout the length thereof for supporting the same and for absorbing the vibrations to which the frame is subjected, movable means arranged on the top of said frame at each end thereof for removably and adjustably holding the article to be tested, and movable means arranged centrally of said frame adapted to be connected to the article for vibrating the same.

2. Article vibration testing apparatus of the class described, as defined in claim 1, wherein the movable vibrating means consists of an electrical vibration motor adjustably arranged on the top of the frame.

3. Article vibration testing apparatus of the class described, including in combination, a longitudinally extending frame made of structural members, a plurality of resilient members arranged below the frame at predetermined spaced intervals throughout the length thereof for supporting the same and for absorbing the vibrations to which the frame is subjected, means arranged on said frame centrally thereof adapted to be connected to the article for vibrating the same, a movable table-like member arranged on said frame to each side of the center thereof and said vibrating means for supporting the article, and means arranged on said frame beyond at least one of said table-like members for applying tension to the article to be tested.

4. Article vibration testing apparatus of the class described, including in combination, a longitudinally extending frame constructed of a plurality of metallic structural members, a plurality of resilient members arranged below the frame at predetermined spaced intervals throughout the length thereof for supporting the same and for absorbing the vibrations to which the frame is subjected, an electrical vibrating motor arranged on said frame centrally thereof adapted to be connected to the article for vibrating the same, a movable table-like member arranged on said frame to each side of the center thereof and said vibration motor for supporting the article, and means arranged on said frame beyond each of said table-like members for applying a predetermined amount of tension to the article to be tested.

5. A testing machine of the class described for vibrating articles comprising a metallic frame including at least a pair of spaced apart substantially parallel structural members, resilient means arranged below said frame at spaced apart intervals throughout the length thereof for supporting the same and for absorbing the vibrations to which the frame is subjected, movable vibrating means mounted on the top of said frame intermediate the length thereof adapted to be connected to the article for vibrating the same, a plurality of table-like members movably mounted on said frame, and means carried by said table-like members for supporting the article to be tested.

6. A testing machine of the class described for vibrating articles comprising a metallic frame including at least a pair of spaced apart substantially parallel I-beam members, a plurality of laterally extending I-beam members arranged below said first mentioned I-beam members at spaced apart intervals throughout the length thereof, a plurality of coil springs arranged below each of said laterally extending I-beam members for supporting the frame and for absorbing the vibrations to which the same is subjected, a vibration motor movably mounted on the top of said first mentioned I-beam members intermediate the length thereof adapted to be connected to the article for vibrating the same, a plurality of table-like members movably mounted on top of said first mentioned I-beam members, and means carried by said table-like members for supporting the article to be tested.

7. A testing machine of the class described for vibrating articles comprising a metallic frame including at least a pair of spaced apart substantially parallel structural members, a plurality of laterally extending structural members arranged below said first mentioned structural members at spaced apart intervals throughout the length thereof, a plurality of resilient members arranged below each of said laterally extending structural members for supporting the frame and for absorbing the vibrations to which the same is subjected, a vibration motor movably mounted on the top of said first mentioned structural members intermediate the length thereof adapted to be connected to the article for vibrating the same, a plurality of table-like members movably mounted on top of said first mentioned structural members and means carried by said table-like members for supporting the article to be tested.

LEONARD C. PESKIN.